US011650339B2

(12) United States Patent
Nelson

(10) Patent No.: US 11,650,339 B2
(45) Date of Patent: May 16, 2023

(54) SPECTROSCOPIC SENSOR FOR ALPHA AND BETA PARTICLES

(71) Applicant: United States of America as represented by the Secretary of the Navy, San Diego, CA (US)

(72) Inventor: Kyle Alan Nelson, San Diego, CA (US)

(73) Assignee: United States of America as represented by the Secretary of the Navy, Washington, DC (US)

( * ) Notice: Subject to any disclaimer, the term of this patent is extended or adjusted under 35 U.S.C. 154(b) by 391 days.

(21) Appl. No.: 15/930,117

(22) Filed: May 12, 2020

(65) Prior Publication Data
US 2021/0356611 A1 Nov. 18, 2021

(51) Int. Cl.
*G01T 1/36* (2006.01)
*G01T 1/20* (2006.01)

(52) U.S. Cl.
CPC .......... *G01T 1/362* (2013.01); *G01T 1/20181* (2020.05); *G01T 1/20184* (2020.05)

(58) Field of Classification Search
CPC .. G01T 1/362; G01T 1/20184; G01T 1/20181
See application file for complete search history.

(56) References Cited

U.S. PATENT DOCUMENTS

| | | | | |
|---|---|---|---|---|
| 5,399,869 A | * | 3/1995 | Usuda | G01T 1/2008 250/487.1 |
| 2010/0108897 A1 | * | 5/2010 | Iwamoto | G21K 4/00 156/230 |
| 2014/0001365 A1 | * | 1/2014 | Akers | G01T 1/2008 250/362 |

(Continued)

FOREIGN PATENT DOCUMENTS

KR 100680595 2/2007

OTHER PUBLICATIONS

Phoswich Detectors For High Energy Backgrounds, Saint-Gobain, 2019 [retrieved on May 12, 2020]. Retrieved from the Internet: <URL: http://www.crystals.saint-gobain.com/sites/imdf.crystals.com/files/documents/phoswich-data-sheet.pdf>.
Ludlum Alpha Beta Phoswich Scintillation Detectors, LACO, Inc. [retrieved on May 12, 2020]. Retrieved from the Internet: <URL: http://www.lacoonline.com/LACO_products/LudlumAlphaBetaPhoswichScintillationDetectorspg2.pdf>.

(Continued)

*Primary Examiner* — Hugh Maupin
(74) *Attorney, Agent, or Firm* — Naval Information Warfare Center, Pacific; Kyle Eppele; James McGee

(57) ABSTRACT

A sensor for spectroscopic measurement of alpha and beta particles includes first and second layers, a photomultiplier, and an analyzer. A first material of the first layer scintillates a first stream of photons for each of the alpha particles. However, the beta particles pass through the first layer. A second material of the second layer scintillates a second stream of photons for each of the beta particles, but passes the first stream of photons for each alpha particle. The photomultiplier amplifies the first and second streams of photons for the alpha and beta particles into an electrical signal. The electrical signal includes a respective pulse for each of the alpha and beta particles. From the electrical signal, the analyzer determines a respective energy of each of the alpha and/or beta particles from a shape of the respective pulse for each of the alpha and beta particles.

20 Claims, 3 Drawing Sheets

(56) References Cited

U.S. PATENT DOCUMENTS

| | | | | |
|---|---|---|---|---|
| 2016/0170037 A1* | 6/2016 | Katsuyama | ............... | G01T 1/36 250/336.1 |
| 2018/0113223 A1* | 4/2018 | Belobraydich | ......... | G01T 1/204 |

OTHER PUBLICATIONS

Seo, B. K. et al., Development of the Dual Scintillator Sheet and Phoswich Detector for Simultaneous Alpha- and Beta-rays Measurement. WM'07 Conference, Mar. 2007 [retrieved on May 12, 2020]. Retrieved from the Internet: <URL: http://xcdsystem.com/wmsym/archives//2007/pdfs/7194.pdf>.

SAB-250 Alpha/Beta Probe, Mirion Technologies, Inc., 2018 [retrieved on May 12, 2020]. Retrieved from the Internet: <URL: http://mirion.s3.amazonaws.com/cms4_mirion/files/pdf/spec-sheets/sab-250-alpha-beta-probe.pdf>.

51BM0.25/SIP-EJ444-E3-X2 Data Sheet, Scionix Holland B.V., Aug. 2, 2019 [retrieved on May 12, 2020]. Retrieved from the Internet: <URL: http://scionix.nl/wp-content/uploads/2019/02/51B0.25_SIP-E3-EJ444-X2.pdf>.

Phoswich Detectors, Bridgeport Instruments, 2017 [retrieved on May 12, 2020]. Retrieved from the Internet: <URL: http://www.bridgeportinstruments.com/products/scint_det/scint_det.html> tab Phoswich.

Tran, Q. T. et al., Optimization of Actinides Trace Precipitation on Diamond/Si PIN Sensor for Alpha-Spectrometry in Aqueous Solution, IEEE Transactions on Nuclear Science, 2014 [retrieved on May 12, 2020]. Retrieved from the Internet: <URL: http://www.researchgate.net/publication/260025320_Optimization_of_Actinides_Trace_Precipitation_on_DiamondSi_PIN_Sensor_for_Alpha-Spectrometry_in_Aqueous_Solution>.

Spectrum of Beta Particles, Nuclear Power, [retrieved on May 12, 2020]. Retrieved from the Internet: <URL: http://www.nuclear-power.net/nuclear-power/reactor-physics/atomic-nuclear-physics/fundamental-particles/beta-particle/spectrum-beta-particles/>.

\* cited by examiner

US 11,650,339 B2

SPECTROSCOPIC SENSOR FOR ALPHA AND BETA PARTICLES

FEDERALLY-SPONSORED RESEARCH AND DEVELOPMENT

The United States Government has ownership rights in this invention. Licensing and technical inquiries may be directed to the Office of Research and Technical Applications, Naval Information Warfare Center Pacific, Code 72120, San Diego, Calif., 92152; voice (619) 553-5118; ssc_pac_t2@navy.mil. Reference Navy Case Number 111274.

BACKGROUND OF THE INVENTION

Decay of radioactive isotopes creates hazardous radiation including alpha and beta particles and gamma rays. Current sensors detect just the existence of this hazardous radiation. Decontamination is needed for an area, an object, or a person when current sensors detect hazardous radiation. However, knowledge of currently unmeasured characteristics of the hazardous radiation can be used for better decision making during decontamination.

SUMMARY

A sensor for spectroscopic measurement of alpha and beta particles includes first and second layers, a photomultiplier, and an analyzer. The first layer includes a first material for receiving the alpha and beta particles. The first material of the first layer scintillates a first stream of photons for each of the alpha particles. However, the beta particles pass through the first layer with negligible scintillation. The second layer includes a second material for receiving the beta particles passing through the first layer and for passing the first stream of photons for each alpha particle. The second material of the second layer scintillates a second stream of photons for each of the beta particles. The photomultiplier amplifies the first and second streams of photons for the alpha and beta particles into an electrical signal. The electrical signal includes a respective pulse for each of the alpha and beta particles. From the electrical signal, the analyzer determines a respective energy of each of the alpha and/or beta particles from a shape of the respective pulse for each of the alpha and beta particles.

BRIEF DESCRIPTION OF THE DRAWINGS

Throughout the several views, like elements are referenced using like references. The elements in the figures are not drawn to scale and some dimensions are exaggerated for clarity.

DETAILED DESCRIPTION OF EMBODIMENTS

The disclosed systems and methods below may be described generally, as well as in terms of specific examples and/or specific embodiments. For instances where references are made to detailed examples and/or embodiments, it should be appreciated that any of the underlying principles described are not to be limited to a single embodiment, but may be expanded for use with any of the other systems and methods described herein as will be understood by one of ordinary skill in the art unless otherwise stated specifically.

Figure 1:
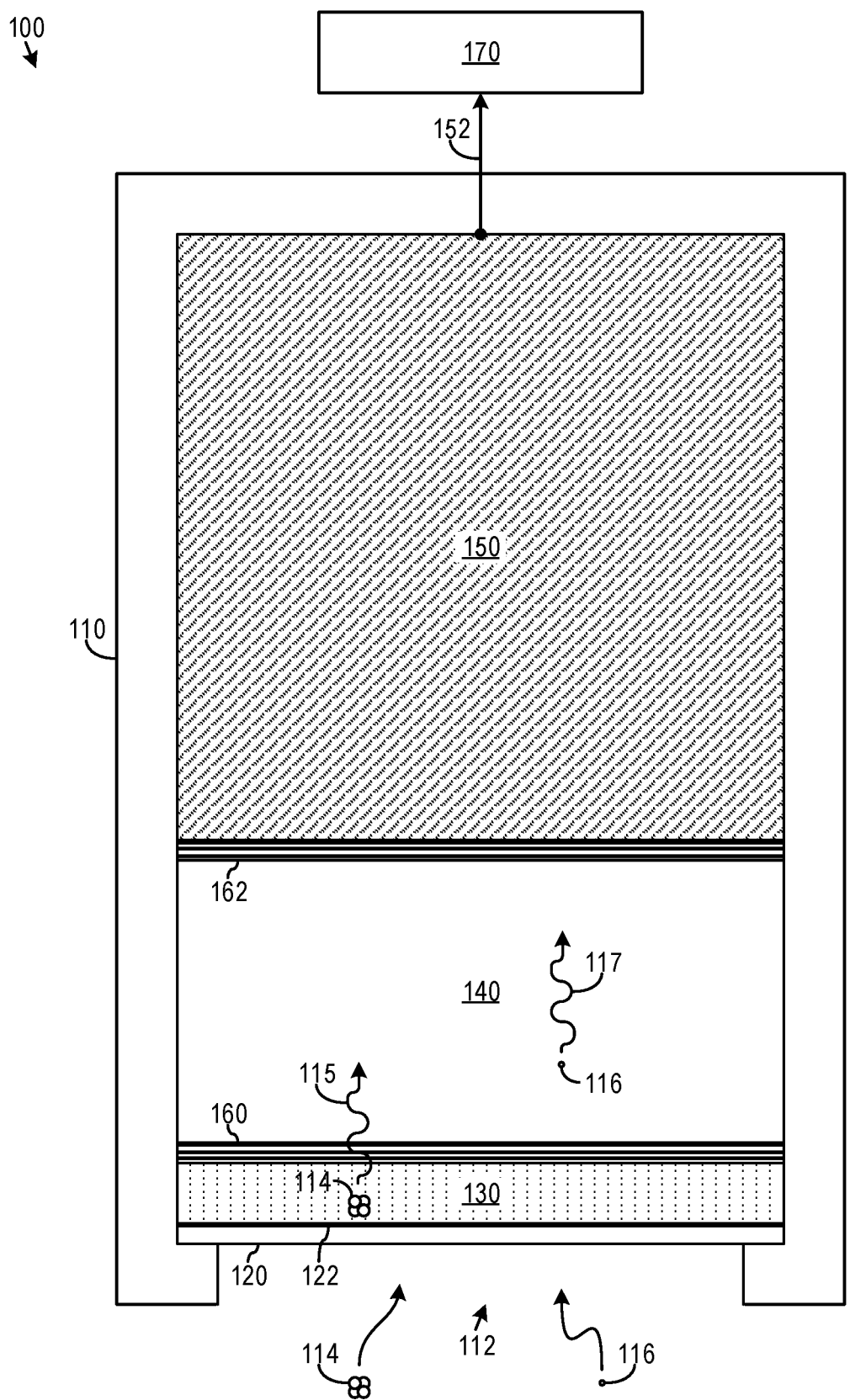
FIG. 1 is cross-sectional diagram of a sensor for spectroscopic measurement of alpha and beta particles in accordance with an embodiment of the invention.

FIG. 1 is cross-sectional diagram of a sensor 100 for spectroscopic measurement of alpha particles 114 and beta particles 116 in accordance with an embodiment of the invention.

A housing 110 has an entrance window 112 for receiving alpha particles 114 and beta particles 116 unimpeded. In one embodiment, the entrance window 112 is covered with an opaque and moisture-impenetrable film, such as a mylar or mica film 120 having an aluminum coating 122 sufficiently thick to block ambient light. The alpha particles 114 and beta particles 116 pass through aluminized film 120 before reaching layer 130.

The material of layer 130 is, for example, Cerium doped Gadolinium Aluminum Gallium glass (GAGG:Ce). Other examples of the material for layer 130 are crystals and glasses including an element of high atomic weight, such as CsI, NaI, LaBr, CeBr, YAG, NaI(Tl+Li), LYSO, BGO, $CaF_2$:Eu, $BaF_2$, CLYC, and CLLB. Layer 130 receives the alpha particles 114 and the beta particles 116, and the material of layer 130 scintillates a respective first stream 115 of photons for each of the alpha particles 114, but the beta particles 116 pass through layer 130 with negligible scintillation. The beta particles 116 pass through layer 130 with the negligible scintillation because the amount of this scintillation is less than 10% and typically less than 1% of the scintillation in layer 130 from the alpha particles 114 and similar scintillation in layer 140 from the beta particles 116.

Layer 140 receives the beta particles 116 passing through layer 130. Layer 140 passes unaffected the respective first stream of photons 115 for each alpha particle 114. The material of the layer 140 has elements of low atomic weight, such as poly-vinyl toluene. The material of layer 140 scintillates a respective second stream 117 of photons for each of the beta particles 116.

To assist passing the first stream of photons 115 from layer 130 into layer 140 and then into photomultiplier 150, and to assist passing the second stream of photons 117 from layer 140 into photomultiplier 150, one embodiment has an optical grease 160 between layers 130 and 140, and an optical grease 162 between layer 140 and the photomultiplier 150.

Typically, a rate of the photons within each stream 115 or 117 quickly rises to a peak rate and then decays at a relatively slower rate as the particle continually transfers its energy into the photons within layers 130 and 140.

Each photon in stream 115 has approximately the same energy corresponding to a band-gap of material 130 and each photon in stream 117 has approximately the same energy corresponding to a different band-gap of material 140. The thickness of the layer 130 is sufficiently thick so that scintillation in layer 130 substantially dissipates the respective energy of each of the alpha particles 114 generated from a radioactive decay of isotopes present on Earth. Similarly, the thickness of layer 140 is sufficiently thick so that scintillation in layer 140 substantially dissipates the respective energy of each of the beta particles 116 generated from a radioactive decay of isotopes present on Earth. However, the thicknesses of layers 130 and 140 are sufficiently thin so that gamma rays pass through these layers with negligible scintillation so that gamma rays either do not produce streams of photons, or produce weak streams of photons that are easily discriminated from the streams 115 and 117 of photons from the alpha and beta particles 114 and 116.

Thus, the energy of the alpha particle 114 that generates stream 115 in layer 130 is proportional to a count of the photons in stream 115. Similarly, the energy of the beta particle 116 that generates stream 117 in layer 140 corresponds to a count of the photons in stream 117. Thus, one embodiment measures the energies of each of the alpha and beta particles 114 and 116 by simply counting the photons in streams 115 and 117.

However, in one embodiment, photomultiplier 150 is a photomultiplier tube or a silicon photomultiplier that does not have sufficient sensitivity to resolve the individual photons in streams 115 and 117. Photomultiplier 150 amplifies the first and second streams 115 and 117 of photons for the alpha and beta particles 114 and 116 into an electrical signal 152. Electrical signal 152 includes a respective pulse for each of the alpha and beta particles 114 and 116. In this embodiment, the pulse on electrical signal 152 for each particle typically has a monotonic quick rise to a peak and then a relatively slower decay produced while the particle continually transfers its energy into the photons of streams 115 and 117.

An analyzer 170 determines, from the electrical signal 152, a respective energy of each of the alpha and/or beta particles 114 and/or 116 from a shape of the respective pulse for each of the alpha and beta particles 114 and 116. The shape of the respective pulse for each of the alpha and beta particles 114 and 116 includes an amplitude and a duration of the respective pulse. Generally, the duration of the respective pulse for each of the alpha and beta particles 114 and 116 is sufficiently short so they do not overlap within the electrical signal 152. The amplitude integrated over the duration for the respective pulse measures the respective energy deposited in layers 130 and 140 of each of the alpha and beta particles 114 and 116.

The analyzer 170 readily distinguishes between alpha and beta particles 114 and 116 because the energies of the alpha particles 114 typically in MeV are higher than the energies of the beta particles 116 typically in keV, and because the duration of the respective pulse for each of the alpha particles 114 is longer, typically measured in microseconds, than the duration of the respective pulse for each of the beta particles 116, typically measured in nanoseconds.

Figure 2:
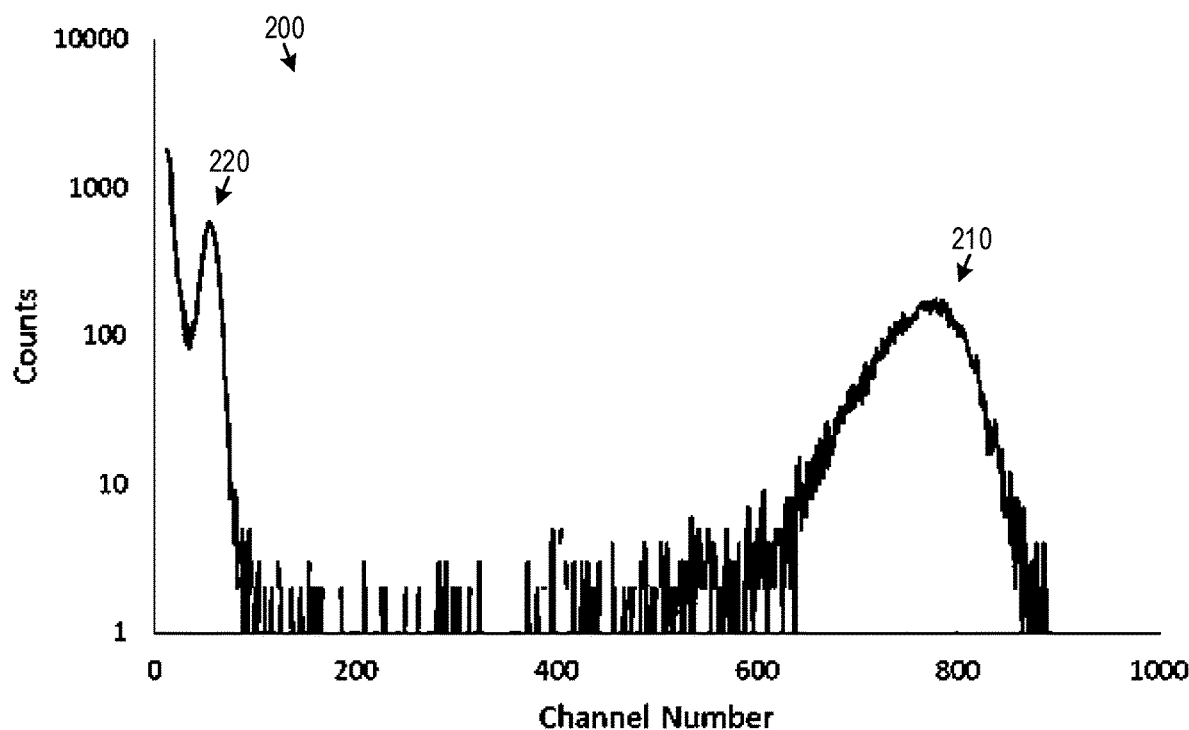
FIG. 2 is graph of the energy spectrum of alpha particles produced from the decay of an example radioactive isotope as measured by a prototype sensor for spectroscopic measurement in accordance with an embodiment of the invention.

FIG. 2 is graph 200 of the energy spectrum of alpha particles produced from the decay of an example radioactive isotope as measured by a prototype sensor for spectroscopic measurement in accordance with an embodiment of the invention. The prototype sensor includes 0.1 mm thickness of GAGG:Ce and a 5 mm thickness of the poly-vinyl toluene EJ-200. Over a time interval, the analyzer of the prototype sensor collects the respective energies for many alpha particles. A count the number of alpha particles having energies in a sequence of energy bins (channels) produces the energy spectrum of intensity versus energy shown in FIG. 2 when the prototype sensor was exposed to Am-241, which is a radioactive isotope found on Earth. The peak 210 corresponds to the 5.5 MeV alpha particle and the peak 220 corresponds to the 60 keV gamma ray emitted during the radioactive decay of Am-241.

When the prototype sensor is exposed to an unknown radioactive isotope or isotopes, the prototype sensor similarly collects the energy spectrum of any alpha particles emitted from the unknown radioactive isotope or isotopes. In part, the prototype sensor determines the unknown radioactive isotope or isotopes from matching the collected energy spectrum with those previously collected during characterization of the prototype sensor with a variety of radioactive isotopes. In one embodiment, a sensor for spectroscopic measurement automatically identifies the radioactive isotope based on these peaks and other features of the energy spectrum.

Figure 3:
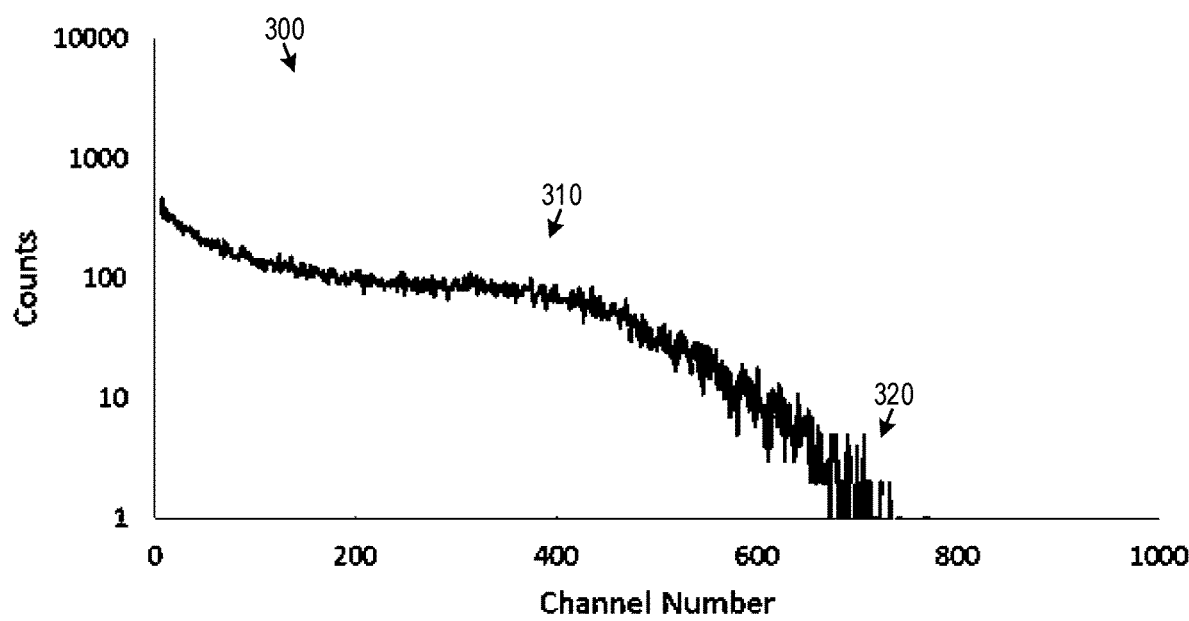
FIG. 3 is graph of the energy spectrum of beta particles produced from the decay of an example radioactive isotope as measured by the prototype sensor for spectroscopic measurement in accordance with an embodiment of the invention.

FIG. 3 is graph 300 of the energy spectrum of beta particles produced from the decay of an example radioactive isotope as measured by the prototype sensor for spectroscopic measurement in accordance with an embodiment of the invention. FIG. 2 and FIG. 3 shown successive measurements with the same prototype sensor. The energy spectrum for Cl-36 shown in FIG. 3 is typical, showing a single broad peak 310 having an upper limit 320 corresponding to the maximum possible energy of 711 keV for the beta particle emitted from Cl-36. This is unlike the more complex spectrums from radioactive isotopes undergoing a radioactive decay that emits alpha particles as shown in FIG. 2. Thus, in one embodiment, distinguishing isotopes does not use the limited information provided by the energy spectrum measured for any beta particles. Instead, a binary decision, whether or not beta particles are detected, validates the isotope identified from the energy spectrum of the alpha particles. This validates, for example, a distinction between an isotope that undergoes fission releasing an alpha particle and stable daughter atoms and an isotope that undergoes fission releasing an alpha particle and an unstable daughter atom that subsequently emits a beta particle. In another embodiment, the radioactive isotope or isotopes are determined from both the energy spectrum of any alpha particles and the energy spectrum of any beta particles.

Figure 4:
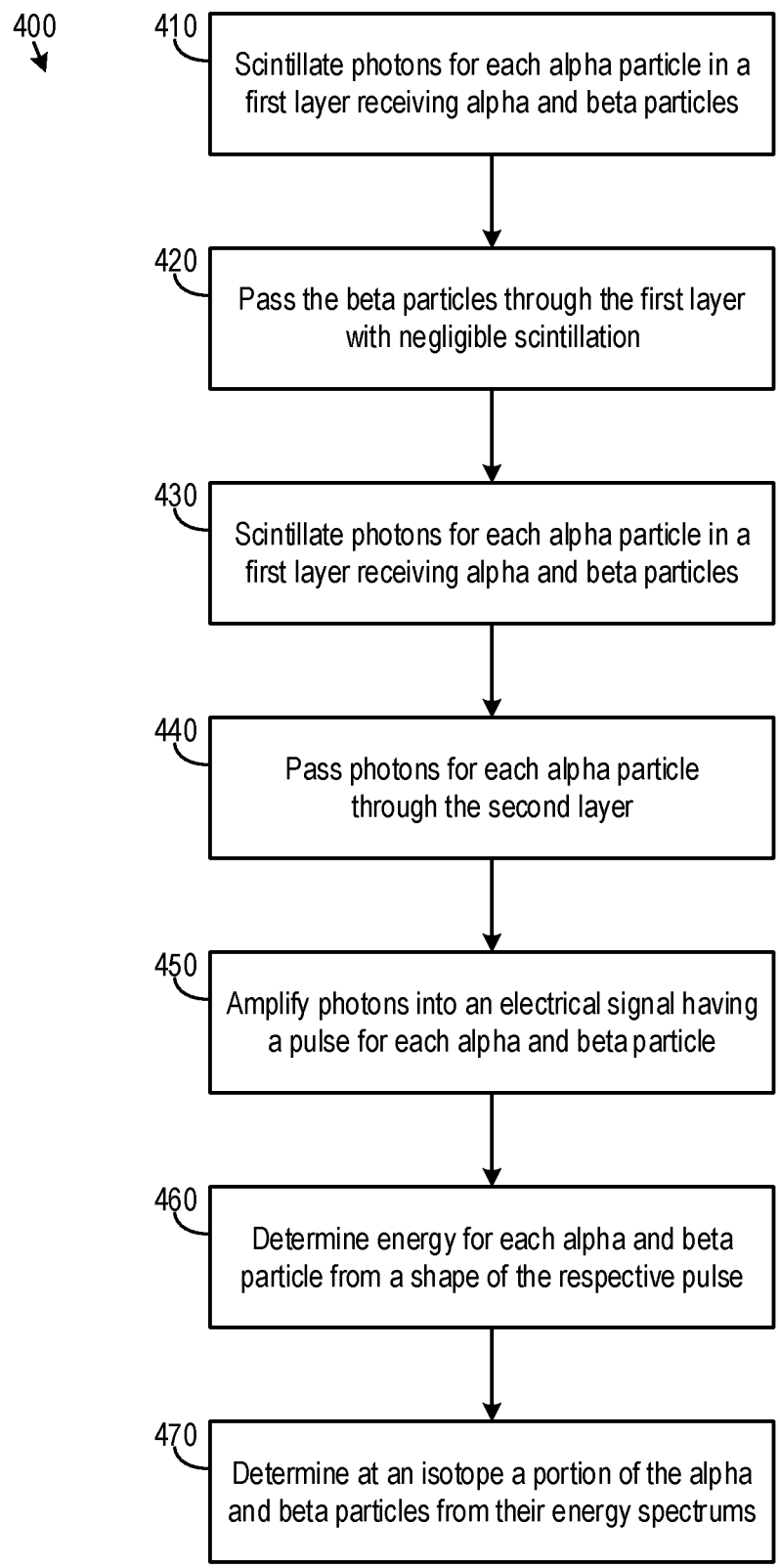
FIG. 4 is flow diagram of a process for spectroscopic measurement of alpha and beta particles in accordance with an embodiment of the invention.

FIG. 4 is flow diagram of a process 400 for spectroscopic measurement of alpha and beta particles in accordance with an embodiment of the invention.

At step 410, a respective first stream of photons for each of the alpha particles is scintillated in a first layer of a first material that receives the alpha and beta particles. At step 420, the beta particles pass through the first layer with negligible scintillation.

At step 430, a respective second stream of photons for each of the beta particles is scintillated in a second layer of a second material that receives the beta particles passing through the first layer. At step 440, the respective first stream of photons for each of the alpha particles passes unaffected through the second layer.

At step 450, the first and second streams of photons for the alpha and beta particles are amplified into an electrical signal. The electrical signal includes a respective pulse for each of the alpha and beta particles. At step 460, a respective energy of each of the alpha and/or beta particles is determined from the respective pulse of the electrical signal. The respective energy of each of the alpha and/or beta particles is determined from a shape of the respective pulse for each of the alpha and beta particles.

At optional step 470, the energies of the alpha and/or beta particles are collected over a time interval to form an energy spectrum for the alpha particles and/or an energy spectrum for the beta particles. A radioactive isotope (or isotopes) is automatically determined from one or both of the energy spectrum for alpha particles and the energy spectrum for beta particles.

Because the spectroscopic measurement determines the radioactive isotope producing the alpha and beta particles, this additional information enables better decontamination decisions than current sensors that detect the existence of hazardous radiation, but not other characteristics of the hazardous radiation.

From the above description of the system and method for spectroscopic measurement of alpha and beta particles, it is manifest that various techniques may be used for implementing the concepts of system 100 and method 400 without departing from the scope of the claims. The described embodiments are to be considered in all respects as illustrative and not restrictive. The apparatus/method disclosed herein may be practiced in the absence of any element that is not specifically claimed and/or disclosed herein. It should also be understood that system 100 and method 400 is not limited to the particular embodiments described herein, but is capable of many embodiments without departing from the scope of the claims.

I claim:

1. A sensor for spectroscopic measurement of alpha and beta particles comprising:
    a first layer of a first material for receiving the alpha and beta particles, wherein the first material of the first layer scintillates a respective first stream of photons for each of the alpha particles, but the beta particles pass through the first layer with negligible scintillation;
    a second layer of a second material for receiving the beta particles passing through the first layer and for passing the respective first stream of photons for each alpha particle, wherein the second material of the second layer scintillates a respective second stream of photons for each of the beta particles;
    a photomultiplier for converting the first and second streams of photons for the alpha and beta particles into an amplified electrical signal, which includes a respective pulse for each of the alpha and beta particles; and
    an analyzer for determining, from the amplified electrical signal, a respective energy of each of the alpha and/or beta particles from a shape of the respective pulse for each of the alpha and beta particles.

2. The sensor of claim 1, wherein over a time interval the analyzer collects the respective energies for the alpha and/or beta particles into an energy spectrum.

3. The sensor of claim 2, wherein the analyzer further determines, from the energy spectrum, at least one isotope generating a portion of the alpha and beta particles during radioactive decay of the at least one isotope.

4. The sensor of claim 1, wherein over a time interval the analyzer collects the respective energies for the alpha and beta particles into an energy spectrum, and from the energy spectrum the analyzer further determines at least one isotope generating a portion of the alpha and beta particles during radioactive decay of the at least one isotope.

5. The sensor of claim 1, wherein the shape of the respective pulse for each of the alpha and beta particles includes an amplitude and a duration of the respective pulse.

6. The sensor of claim 5, wherein the duration of the respective pulse for each of the alpha and beta particles is sufficiently short so they do not overlap within the amplified electrical signal.

7. The sensor of claim 5, wherein the duration of the respective pulse for each of the alpha particles is longer than the duration of the respective pulse for each of the beta particles.

8. The sensor of claim 5, wherein the amplitude integrated over the duration for the respective pulse measures the respective energy.

9. The sensor of claim 8, wherein the respective energy of each of the alpha particles measures in MeV, and the respective energy of each of the beta particles measures in keV.

10. The sensor of claim 1, wherein the beta particles pass through the first layer with the negligible scintillation because the negligible scintillation is insignificant relative to both the scintillation in the first layer from the alpha particles and the scintillation in the second layer from the beta particles.

11. The sensor of claim 1, wherein the photomultiplier receives the respective first stream of photons for each of the alpha particles from the first layer via the second layer, and the photomultiplier receives the respective second stream of photons for each of the beta particles from the second layer.

12. The sensor of claim 1, wherein a thickness of the first layer is sufficiently thick so that scintillation in the first material substantially dissipates the respective energy of each of the alpha particles generated from radioactive decay of a plurality of isotopes present on Earth.

13. The sensor of claim 12, wherein the thickness of the first layer is sufficiently thin so that gamma rays pass through the first layer with negligible scintillation.

14. The sensor of claim 1, wherein a thickness of the second layer is sufficiently thick so that scintillation in the second material substantially dissipates the respective energy of each of the beta particles generated from radioactive decay of a plurality of isotopes present on Earth.

15. The sensor of claim 1, wherein the first material includes at least one element of high atomic weight and the second material includes a plurality of elements of low atomic weight.

16. The sensor of claim 15, wherein the first material is Cerium doped Gadolinium Aluminum Gallium glass (GAGG:Ce) and the second material is poly-vinyl toluene.

17. The sensor of claim 1, wherein the photomultiplier is one of a photomultiplier tube and a silicon photomultiplier.

18. The sensor of claim 1 further comprising an opaque and moisture-impenetrable entrance window through which the alpha and beta particles pass before reaching the first layer, the entrance window including at least one of aluminum, mylar, and mica.

19. The sensor of claim 18 further comprising an optical grease between the first layer and the second layer, and an optical grease between the second layer and the photomultiplier.

20. A method for spectroscopic measurement of alpha and beta particles comprising:
    scintillating a respective first stream of photons for each of the alpha particles in a first layer of a first material receiving the alpha and beta particles;
    passing the beta particles through the first layer with negligible scintillation;
    scintillating a respective second stream of photons for each of the beta particles in a second layer of a second material for receiving the beta particles passing through the first layer;
    passing the respective first stream of photons for each of the alpha particles through the second layer;

converting the first and second streams of photons for the alpha and beta particles into an amplified electrical signal, which includes a respective pulse for each of the alpha and beta particles; and determining, from the amplified electrical signal, a respective energy of each of the alpha and/or beta particles from a shape of the respective pulse for each of the alpha and beta particles.

* * * * *